United States Patent
Schlennert et al.

(10) Patent No.: US 11,646,909 B2
(45) Date of Patent: May 9, 2023

(54) METHOD FOR DATA TRANSMISSION IN A REDUNDANTLY OPERABLE COMMUNICATIONS NETWORK AND COUPLING COMMUNICATION DEVICE

(71) Applicant: Siemens Aktiengesellschaft, Munich (DE)

(72) Inventors: Dieter Schlennert, Obermichelbach (DE); Christian Müller, Wendelstein (DE); Thomas Weichlein, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/638,639

(22) PCT Filed: Jul. 29, 2020

(86) PCT No.: PCT/EP2020/071365
§ 371 (c)(1),
(2) Date: Feb. 25, 2022

(87) PCT Pub. No.: WO2021/037466
PCT Pub. Date: Mar. 4, 2021

(65) Prior Publication Data
US 2022/0368561 A1 Nov. 17, 2022

(30) Foreign Application Priority Data
Aug. 30, 2019 (EP) .................................... 19194686

(51) Int. Cl.
*H04L 12/437* (2006.01)
*H04L 12/423* (2006.01)
(Continued)

(52) U.S. Cl.
CPC .......... *H04L 12/437* (2013.01); *H04L 12/423* (2013.01); *H04L 41/12* (2013.01); *H04L 2012/421* (2013.01)

(58) Field of Classification Search
CPC ..... H04L 12/437; H04L 12/423; H04L 41/06; H04L 41/12; H04L 2012/421
See application file for complete search history.

(56) References Cited

U.S. PATENT DOCUMENTS

| 2009/0022168 A1 | 1/2009 | Sakauchi et al. |
| 2009/0109841 A1 | 4/2009 | Nozaki et al. |

(Continued)

FOREIGN PATENT DOCUMENTS

| CN | 102801608 | 11/2012 |
| CN | 107124322 | 9/2017 |

(Continued)

OTHER PUBLICATIONS

Machine Translation of EP 3,026,848, (Year: 2022).*
PCT International Search Report dated Sep. 14, 2020 based on PCT/EP2020/071365 filed Jul. 29, 2020.

*Primary Examiner* — Benjamin Lamont
(74) *Attorney, Agent, or Firm* — Cozen O'Connor

(57) ABSTRACT

A communication device with an activated ring controller provided in both first and second subnetworks for data transmission in a redundantly operable communications network, which includes at least one first and one second subnetwork, which each include communication devices interconnected within a ring topology, wherein the subnetworks are interconnected via coupling line sections to which coupling communication devices are connected, where the coupling line section to which a selected coupling communication device is connected is operated as an inactive reserve coupling line section until a disruption occurs, whilst another coupling line section is operated as an active main (Continued)

coupling line section, where coupling communication devices connected to the main coupling line section transmit status datagrams to the selected coupling communication device which additionally include configuration information about whether the particular coupling communication device connected to the main coupling line section is an activatable ring controller.

15 Claims, 2 Drawing Sheets

(51) Int. Cl.
*H04L 41/12* (2022.01)
*H04L 12/42* (2006.01)

(56) References Cited

U.S. PATENT DOCUMENTS

| | | | |
|---|---|---|---|
| 2009/0296569 A1* | 12/2009 | Ramalho Ribeiro Dos Santos | H04L 45/22 370/222 |
| 2010/0226260 A1* | 9/2010 | Zinjuvadia | H04L 45/48 370/256 |
| 2010/0296416 A1* | 11/2010 | Lee | H04L 12/4637 370/258 |
| 2011/0044162 A1* | 2/2011 | Ryoo | H04L 12/437 370/216 |
| 2012/0195233 A1* | 8/2012 | Wang | H04L 12/437 370/258 |
| 2013/0258855 A1* | 10/2013 | Bos | H04L 12/1868 370/235 |

FOREIGN PATENT DOCUMENTS

| | | |
|---|---|---|
| CN | 108270624 | 7/2018 |
| DE | 10207529 | 9/2003 |
| EP | 1062787 | 8/2003 |
| EP | 1476987 B1 | 8/2005 |
| EP | 1476988 | 9/2005 |
| EP | 1955480 B1 | 12/2009 |
| EP | 2528282 | 11/2012 |
| EP | 2413538 B1 | 3/2013 |
| EP | 2854345 A1 | 4/2015 |
| EP | 3026848 A1 * | 6/2016 |
| EP | 2854345 B1 | 6/2018 |
| WO | WO 03/073704 | 9/2003 |

* cited by examiner

US 11,646,909 B2

METHOD FOR DATA TRANSMISSION IN A REDUNDANTLY OPERABLE COMMUNICATIONS NETWORK AND COUPLING COMMUNICATION DEVICE

CROSS-REFERENCE TO RELATED APPLICATIONS

This is a U.S. national stage of application No. PCT/EP2020/071365 filed 29 Jul. 2020. Priority is claimed on European Application No. 19194686.2 filed 30 Aug. 2019, the content of which is incorporated herein by reference in its entirety.

BACKGROUND OF THE INVENTION

1. Field of the Invention

The present invention relates to a method for data transmission in a redundantly operable communication network and to a coupling communication device, in particular for an industrial automation system.

2. Field of the Invention

An industrial automation system normally comprises a multiplicity of automation devices networked to one another via an industrial communication network and is used for controlling or regulating installations, machines or devices within the context of a production or process automation. Time-critical constraints in industrial automation systems mean that predominantly realtime communication protocols, such as PROFINET, PROFIBUS, realtime Ethernet or time-sensitive networking (TSN), are used for communication between automation devices.

Interruptions to communication connections between computer units of an industrial automation system or automation devices can lead to undesirable or unnecessary repetition of a transmission of a service request. Additionally, messages that are not transmitted or not transmitted completely can prevent an industrial automation system from changing to or remaining in a safe operating state, for example. This can finally lead to failure of a complete production installation and to costly production downtime. One particular problem area in industrial automation systems regularly results from message traffic that contains relatively many but relatively short messages, which intensifies the above problems.

Use for often extremely different applications can create problems in Ethernet-based communication networks, for example, if network resources are used for transmitting data streams or data frames with realtime demands in competition with transmitting data frames having a large payload content without specific quality of service demands. This can lead to data streams or data frames with realtime demands not being transmitted in accordance with a demanded or required quality of service.

Media Redundancy Protocol (MRP) is defined in the International Electrotechnical Commission (IEC) 62439 standard and makes it possible to compensate for individual connection failures in networks having a simple ring topology in the case of bursty redundant transmission of messages. Bursty media redundancy methods can be implemented with relatively little effort, in principle, but have fundamentally increased reconfiguration times compared to smooth redundancy methods, in which two or more redundant paths are always used at the same time. PROFINET (IEC 61158 type 10) references MRP as a bursty media redundancy method within a communication network having a ring topology.

EP 1 062 787 B1 describes an Ethernet-based communication network having redundancy properties in which a redundancy manager connected to line ends of the communication network uses test telegrams to test a state of the communication network. In the event of a network interruption, the redundancy manager connects the line ends, and in this way ensures further network operation in the millisecond range.

EP 1 476 987 B1 discloses an Ethernet communication network having redundancy properties, in which multiple coupling devices and one coupling device operated as a redundancy manager are connected to one another in a ring topology. To produce a linear topology, the redundancy manager breaks open the ring topology if test telegrams that the redundancy manager has transmitted are received at the respective other port within a predefined time interval. At least one coupling device is operated as a redundancy manager observer and uses its own test telegrams to ascertain interruptions within the ring topology. To produce a linear topology, the redundancy manager observer breaks open the ring topology if its test telegrams are received at the respective other port within a predefined time interval.

EP 1 476 988 B1 relates to an Ethernet communication network having redundancy properties, in which multiple coupling devices and one coupling device operated as a redundancy manager are connected to one another in a ring topology. To produce a linear topology, the redundancy manager breaks open the ring topology if test telegrams that the redundancy manager has transmitted are received at the respective other port within a predefined time interval. At least one coupling device is operated as a redundancy manager observer and evaluates telegrams that it receives at its port connected to the redundancy manager. Based on an evaluation result, the redundancy manager observer breaks open the ring topology to produce a linear topology and signals an error if a topology state indicated in a test telegram is inconsistent with a topology state ascertained by the redundancy manager observer. EP 1 955 480 B1 describes an Ethernet communication network having redundancy properties, in which at least two network segments, each having multiple Ethernet switches, are connected to one another via a redundant connection formed by at least two coupling channels. During configuration of coupling devices associated with the redundant connection, a programming device stores a logical name for the redundant connection in a respective memory of the coupling devices. In a network startup phase, the coupling devices ascertain connection partners belonging to the same redundant connection by distributing special telegrams that comprise the logical name of the redundant connection. Based on an order criterion, they stipulate which coupling channel is activated or deactivated during fault-free operation.

EP 2 413 538 B1 discloses a method for redundant communication in a communication system, in which the communication system comprises a first and a second communication network, which are connected to one another via at least one coupling node. Transmission of data that originate from the first communication network back to the first communication network from the second communication network is prevented on the basis of information defined prior to transmission.

EP 2 854 345 B1 relates to a method for message transmission in a redundantly operable industrial communication network having at least a first and a second subnetwork having a ring topology, which are connected to one another via a subnetwork coupling. Coupling communication devices take a priority characteristic associated with each of them as a basis for selecting one coupling communication device from among one another, the coupling control unit of which is activated. The other coupling communication devices deactivate their coupling control unit, on the other hand. A first coupling communication device of the first subnetwork and a first coupling communication device of the second subnetwork interchange test messages with one another for the purpose of detecting an interruption between the two first coupling communication devices, while a second coupling communication device of the first subnetwork and a second coupling communication device of the second subnetwork interchange test messages with one another for the purpose of detecting an interruption between the two second coupling communication devices.

In the case of an MRP interconnection according to IEC 62439-2, edition 2, for coupling MRP ring networks, a coupling switch used as a MRP interconnection client can be operated as a media redundancy manager at the same time. In the worst case, failure of a main MRP interconnection or of an MRP interconnection client must result not only in changeover to a reserve MRP interconnection but also in relatively time-consuming selection of a switch, which is operated as the new media redundancy manager. This can lead to substantially increased periods for reconfiguring an MRP ring or an MRP interconnection. A fault-related topology change triggering the reconfiguration normally involves all of the switches in an MRP ring network erasing their local source address tables (forwarding databases). It makes sense that selection of the switch that is operated as the new media redundancy manager should be complete prior to the source address tables being erased, because otherwise these do not correctly reproduce a respective current network topology.

SUMMARY OF THE INVENTION

In view of the foregoing, it is therefore an object of the present invention to provide a coupling communication device and a method for data transmission in a redundantly operable communication network that allows reliable, failsafe coupling of two subnetworks having ring topology and shortened reconfiguration times following faults.

This and other objects and advantages are achieved in accordance with the invention by a coupling communication device and method for data transmission in a redundantly operable communication network, where the communication network comprises at least a first and a second subnetwork. The two subnetworks each comprise communication devices that are connected to one another within a ring topology and that each have at least one coupling element and also a first and a second ring connection, which are switchably connectable to one another by the coupling element. The coupling element can be realized via a backplane switch or a matrix switch, for example. The two subnetworks additionally each comprise a communication device having an activated ring controller that detects an interruption within the respective ring topology and also controls forwarding of payload data between the ring connections of the respective communication device on the basis of a detected interruption.

Preferably, an activated ring controller detects an interruption within the respective ring topology based on first test datagrams that are sent by the respective communication device, or the communication device operated as redundancy manager, and received again in the undisturbed ring state. In accordance with a particularly preferred embodiment of the present invention, datagrams within the first and the second subnetwork are transmitted in accordance with the Media Redundancy Protocol.

The two subnetworks are, in accordance with the invention, connected to one another via two coupling paths and each comprise two coupling communication devices, connected to the coupling paths that each additionally have a coupling connection and a coupling control unit. In particular, the coupling connection can be switchably connected to the two ring connections of the respective coupling communication device by the coupling element. In addition, one coupling communication device is selected, the coupling control unit of which is activated, while the coupling control units of the other coupling communication devices are deactivated. The coupling path to which the selected coupling communication device is connected is operated as an inactive reserve coupling path until a fault occurs, while the other coupling path is operated as the active main coupling path for transmitting payload data.

In accordance with the embodiments of the invention, the coupling communication devices connected to the main coupling path detect the occurrence of a fault on the main coupling path and transmit status datagrams to the selected coupling communication device. The status datagrams additionally comprise configuration information regarding whether the respective coupling communication device connected to the main coupling path comprises an activable ring controller.

Preferably, the coupling communication devices connected to the main coupling path interchange second test datagrams among one another for the purpose of detecting the occurrence of a fault on the main coupling path. In accordance with a particularly preferred embodiment of the present invention, the selected coupling communication device is operated as a media redundancy interconnection manager in accordance with IEC standard 62439-2, and the coupling communication devices connected to the main coupling path are each operated in the link check mode in accordance with IEC standard 62439-2.

In accordance with the embodiments of the invention, in the event of a fault occurring on the main coupling path, which is signalled by a status datagram, the selected coupling communication device activates the reserve coupling path for transmitting payload data and transmits a topology change datagram to each of the two subnetworks. Such a topology change datagram prompts the communication devices, at least indirectly, to erase stored content of their respective local source address table or forwarding database after a predefined period of time has elapsed. The predefined period of time is shortened compared to a reference value if no coupling communication device connected to the main coupling path comprises an activable ring controller. In this way, the configuration information transmitted via the status datagrams by the coupling communication devices connected to the main coupling path can be used specifically for adapting the predefined period of time. Apart from a few exceptions, ring or interconnection reconfiguration times can thus be significantly shortened.

Preferably, the predefined period of time is indicated by the selected coupling communication device in the topology change datagram and shortened based on the configuration information in the respective status datagram. In accordance with a further preferred embodiment of the present invention, the activated coupling control unit controls forwarding of payload data from and/or to the coupling connection of the selected coupling communication device based on a detected fault occurrence on the main coupling path. In particular, the coupling connection can thus be changed over between a forwarding state and a blocked state. In addition, a status datagram advantageously displays a link that has been set up or cleared at the respective coupling connection. This allows topology changes on the main coupling path to be tracked reliably and quickly.

In accordance with a particularly preferred configuration of the present invention, the status datagrams are MRP_InLinkChange data frames in accordance with IEC standard 62439-2, while the topology change datagrams are MRP_InTopologyChange data frames in accordance with IEC standard 62439-2. It is thus possible for the disclosed embodiments of the present invention to be implemented totally in compliance with IEC standard 62439-2. In addition, the communication devices having an activated ring control unit advantageously send an MRP_TopologyChange data frame in accordance with IEC standard 62439-2 to the communication devices within their respective subnetwork on receiving the MRP_InTopologyChange data frame. The MRP_TopologyChange data frame comprises an indication of the period of time predefined by the selected coupling communication device. Accordingly, upon receiving the MRP_TopologyChange data frame the communication devices erase their respective local source address table after the predefined period of time has elapsed from reception of the MRP_TopologyChange data frame. This ensures that the ring and the interconnection or ring coupling are reconfigured in sync with one another.

The first or the second subnetwork can each comprise multiple communication devices having an activable ring controller. Here, the communication devices having an activable ring control unit take a priority characteristic associated with each of them as a basis for selecting one communication device from among one another for the respective subnetwork, the ring control unit of which communication device is activated, while the other communication devices within the respective subnetwork deactivate their ring control unit. This ensures that it is also possible to compensate for failure of a communication device having an activated ring control unit. Analogously, the coupling communication devices can take a priority characteristic associated with each of them as a basis for selecting one coupling communication device from among one another, the coupling control unit of which is activated, while the other coupling communication devices deactivate their coupling control unit. Accordingly, it is also possible to compensate for failure of the selected coupling communication device by re-selecting one coupling communication device from among the remaining coupling communication devices, the coupling control unit of which coupling communication device is activated.

The coupling communication device in accordance with disclosed embodiments of the invention is intended to perform a method in accordance with the preceding embodiments and has at least one coupling element and also a first and a second ring connection and a coupling connection, which are switchably connectable to one another by the coupling element. Additionally, the coupling communication device has an activable coupling control unit, which is configured and to operate a coupling path to which the coupling communication device is connected as an inactive reserve coupling path until a fault occurs and another coupling path as the active main coupling path for transmitting payload data. In addition, the coupling communication device is configured, when operating as a coupling communication device connected to the main coupling path, to detect the occurrence of a fault on the main coupling path and to transmit status datagrams to a selected coupling communication device having an activated coupling control unit. The status datagrams additionally comprise configuration information regarding whether the coupling communication device comprises an activable ring controller.

In addition, the coupling communication device in accordance with disclosed embodiments of the invention is configured, when operating as a selected coupling communication device, so as in the event of a fault occurring on the main coupling path, which is signalled by a status datagram, to activate the reserve coupling path for transmitting payload data and to transmit a respective topology change datagram that prompts further communication devices to erase their respective local source address table after a predefined period of time has elapsed. Additionally, the coupling communication device is configured, when operating as a selected coupling communication device, to shorten the predefined period of time compared to a reference value if no coupling communication device connected to the main coupling path comprises an activable ring control unit. Preferably, the coupling communication device comprises a switch or a bridge.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained more thoroughly below using an exemplary embodiment with reference to the drawing, in which.

DETAILED DESCRIPTION OF THE INVENTION

Figure 1:
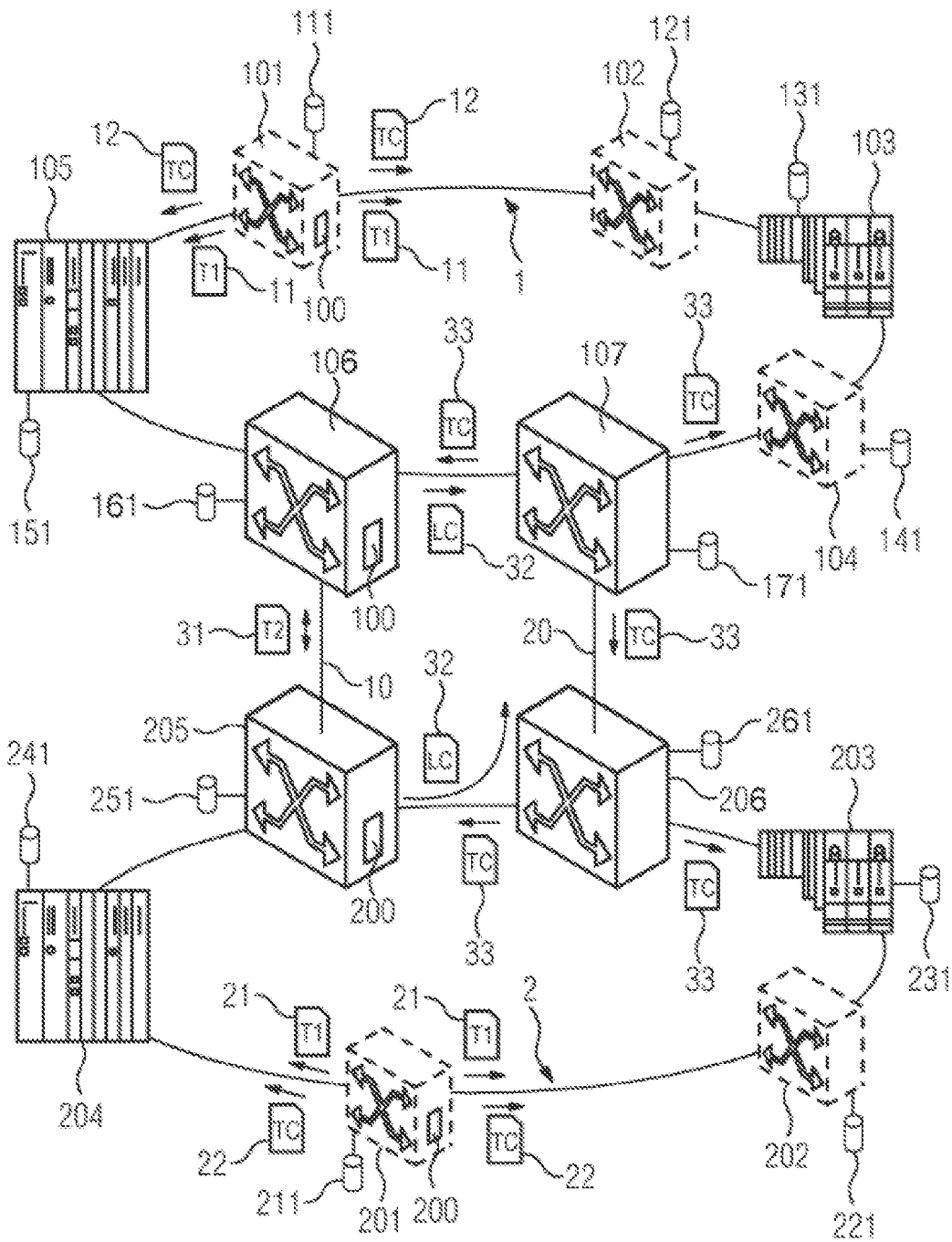
FIG. 1 shows a communication network having two subnetworks, each of which comprises communication devices connected to one another within a ring topology, and having four coupling communication devices for a redundant subnetwork coupling in accordance with the invention.

The industrial communication network shown in FIG. 1 comprises two subnetworks 1, 2, which are redundantly coupled to one another via four coupling switches 106-107, 205-206 or two coupling paths 10, 20. Within the two subnetworks 1, 2, each of which comprises multiple communication devices 101-107, 201-206 connected to one another within a ring topology, data frames are transmitted in accordance with the Media Redundancy Protocol (MRP). In the present exemplary embodiment, the communication devices 101-107, 201-206 each have a switch or bridge functionality and also at least a first and a second ring connection and a backplane switch, via which the ring connections are switchably connectable to one another. The coupling switches 106-107, 205-206 connected to the two coupling paths 10, 20 additionally each have a coupling connection and a coupling control unit for a redundant subnetwork coupling. The coupling connection can be switchably connected to the two ring connections of the respective coupling switch 106-107, 205-206 by the backplane switch.

In each of the first and second subnetworks 1, 2, a communication device 101, 201 is operated as a media redundancy manager. To this end, the communication devices 101, 201 operated as the media redundancy manager each comprise an activated ring control unit 100, 200. This ring control unit 100, 200 detects an interruption within the respective ring topology on the basis of first test data frames 11, 21 that are sent and received again by the respective communication device 101, 201. In addition, the ring control unit 100, 200 controls forwarding of data frames containing payload data between the ring connections of the respective communication device 101, 201 based on a detected interruption.

In principle, the other communication devices 102-107, 202-206 can also be operated as a media redundancy manager if they have an activable ring controller. If multiple communication devices within a ring topology have an applicable functionality, then a selection method is used among these communication devices to determine which communication device is operated as the media redundancy manager, or which communication device activates its ring controller 100, 200. By way of example, the communication devices having an activable ring controller can take a priority characteristic associated with each of them as a basis for selecting one communication device from among one another for the respective subnetwork, the ring control unit of which communication device is activated, while the other communication devices within the respective subnetwork deactivate their ring control unit.

The communication devices 101-106, 201-206 may particularly be associated with an industrial automation device, such as a programmable logic controller or a field device, or may be integrated in an industrial automation device. In accordance with FIG. 1, the communication devices 103, 105, 203, 204 in the present exemplary embodiment are integrated in a programmable logic controller or in a decentralized peripheral device.

In the present exemplary embodiment, precisely one coupling switch 107 is selected, the coupling control unit of which is activated, while the coupling control units of the other coupling switches 106, 205-206 are deactivated. In principle, the coupling switches 106-107, 205 206 can take a priority characteristic associated with each of them as a basis for selecting one coupling switch from among one another, the coupling control unit of which is activated, while the other coupling switches automatically deactivate their coupling control unit.

The coupling path 20 to which the selected coupling switch 107 is connected is operated as an inactive reserve coupling path until a fault occurs, while the other coupling path 10 is operated as the active main coupling path for transmitting payload data. The selected coupling switch 107 is operated as a media redundancy interconnection manager (MIM), while the coupling switches 106, 205 connected to the main coupling path are each operated as media redundancy interconnection clients (MIC) in the link check mode in accordance with IEC standard 62439-2, edition 2, in the present exemplary embodiment.

The coupling switches 106, 205 connected to the main coupling path 10 detect the occurrence of a fault on the main coupling path 10 and transmit MRP_InLinkChange data frames 32 to the selected coupling switch 107. To detect the occurrence of a fault on the main coupling path 10, the coupling switches 106, 205 connected to the main coupling path 10 interchange second test data frames 31 among one another. The MRP_InLinkChange data frames 32 display links that have been set up or cleared (Link Up, Link Down) at the respective coupling connection. An MRP_InLinkChange data frame 32, for example, is also transmitted when a coupling switch 106, 205 connected to the main coupling path 10 is booted. Furthermore, the MRP_InLinkChange data frames 32 additionally comprise configuration information regarding whether the respective coupling switch 106, 205 connected to the main coupling path comprises an activable ring control unit 100, 200. Preferably, this configuration information is inserted into the MRP_InLinkChange data frame 32 as a projection bit.

In the event of a fault occurring on the main coupling path 10, which is signalled by an MRP_InLinkChange data frame 32, the selected coupling switch 107 activates the reserve coupling path 20 for transmitting payload data and transmits an MRP_InTopologyChange data frame 33 to each of the two subnetworks 1, 2. The MRP_InTopologyChange data frame 33 indirectly prompts the communication devices 101-107, 201-206 to erase stored content of their respective local source address table or forwarding database 111, 121, 131, 141, 151, 161, 171, 211, 221, 231, 241, 251, 261, which is sometimes also referred to as a filtering database, after a predefined period of time has elapsed. This erasing preferably comprises only the ring, and possibly coupling, connections of the communication devices 101-107, 201-206. The predefined period of time is shortened compared to a reference value if no coupling switch 106, 205 connected to the main coupling path 10 comprises an activable ring control unit 100, 200.

Preferably, the predefined period of time is indicated by the selected coupling switch 107 in the MRP_InTopologyChange data frame 33 and shortened based on the configuration information in the respective MRP_InLinkChange data frame 32. In addition, the activated coupling control unit of the selected coupling switch 107 in the present exemplary embodiment controls forwarding of payload data from and/or to the coupling connection of the selected coupling switch 107 based on a detected fault occurrence on the main coupling path 10.

The communication devices 101, 201 operated as media redundancy manager send an MRP_TopologyChange data frame 12 to the communication devices 102-107, 202-206 within their respective subnetwork 1, 2 upon receiving an MRP_InTopologyChange data frame 33. The MRP_TopologyChange data frame 12 comprises an indication of the period of time predefined by the selected coupling switch 107. Upon receiving such an MRP_TopologyChange data frame 12, the communication devices 101-107, 201-206 erase their respective local source address table 111, 121, 131, 141, 151, 161, 171, 211, 221, 231, 241, 251, 261 after the predefined period of time has elapsed from reception of the MRP_TopologyChange data frame 12. Described forwarding of the MRP_InTopologyChange data frame 12 and sending, initiated thereby, of the MRP_TopologyChange data frame achieve in particular substantially synchronous reconfiguration in the subnetworks 1, 2 connected to one another via the redundant subnetwork coupling.

The MRP_InTopologyChange data frame 33 and the MRP_TopologyChange data frame 12 can be transmitted repeatedly up to a defined maximum number of repetitions MRP_IN_TOPNRmax or MRP_TOPNRmax within a defined time interval MRP_IN_TOPchgT or MRP_TOPchgT, for example. Each repetition resets a timer in each of the communication devices 101-107, 201-206 to erase their respective local source address table 111, 121, 131, 141, 151, 161, 171, 211, 221, 231, 241, 251, 261, with the result that the communication devices do not erase their source address tables at least during the respective defined time interval MRP_IN_TOPchgT or MRP_TOPchgT. The above predefined period of time after which the source address tables are erased thus corresponds to no more than a product of the defined time interval MRP_IN_TOPchgT=MRP_TOPchgT and the defined maximum number of repetitions MRP_IN_TOPNRmax=MRP_TOPNRmax.

In principle, it is possible for one or both coupling switches 106, 205 connected to the main coupling path 10 to be projected both as primary MIC and as media redundancy manager. If a primary MIC 106, 205 with the role of media redundancy manager fails, then the selected coupling switch 107, as MIM, starts a reconfiguration process. A new media redundancy manager becomes active in an MRP ring only when the first test data frames 11 and 21 of the failed media redundancy manager are absent. As a result, the MIM 107 needs to transmit the MRP_InTopologyChange data frames 33 until a new media redundancy manager is active, i.e., at most until the above maximum predefined period of time elapses.

The MIM 107 thus evaluates projection information of the primary MICs 106, 205 indicated in MRP_InTopologyChange data frames 32 and implements requirements for the defined time interval MRP_IN_TOPchgT and for the defined maximum number of repetitions MRP_IN_TOPNRmax adaptively, for example, in accordance with Table 1 below, where MRM stands for media redundancy manager.

TABLE 1

| MRM active | MRP_IN_TOPchgT | MRP_IN_TOPNRmax |
|---|---|---|
| NO | 10 | 3 |
| YES | 20 | 4 |

Thus, if no primary MIC 106, 205 has a role as media redundancy manager, this example already results in significantly shortened reconfiguration times.

Figure 2:
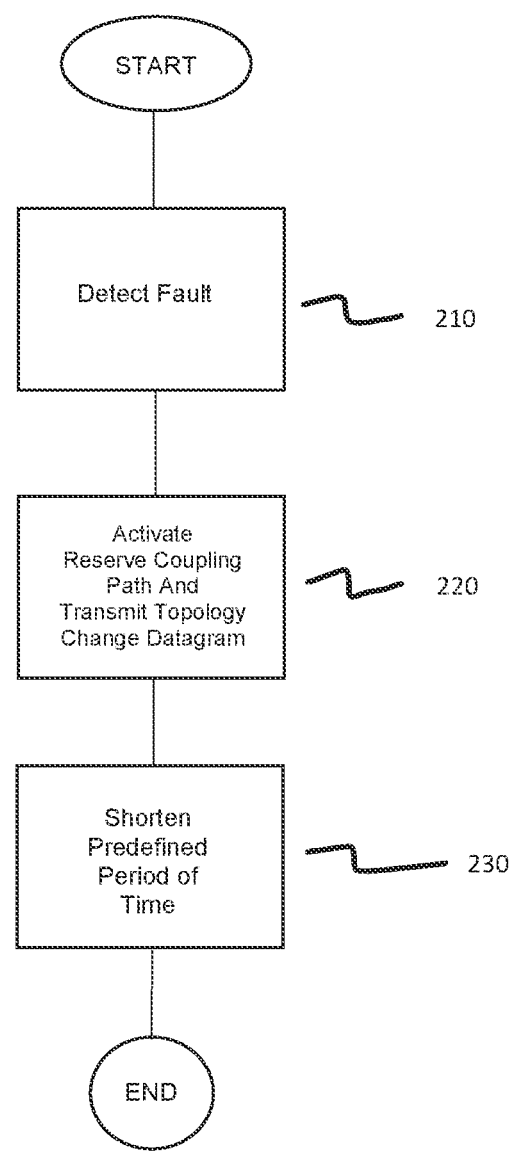
FIG. 2 is a flowchart of the method in accordance with the invention.

FIG. 2 is a flowchart of the method for data transmission in a redundantly operable communication network, in which the communication network comprises at least a first and a second subnetwork 1, 2, where the first and second subnetworks 1, 2 each comprise communication devices 101-107, 201-206 interconnected within a ring topology and each have at least one coupling element and a first and a second ring connection, which are switchably interconnectable by the at least one coupling element, the first and second subnetworks each comprise a communication device 101, 201 including an activated ring controller 100, 200 that detects an interruption within a respective ring topology and controls forwarding of payload data between ring connections of a respective communication device based on a detected interruption. In addition, the first and second subnetworks are interconnected via two coupling paths 10, 20 and each comprise two coupling communication devices 106-107, 205-206, connected to the coupling paths, which each additionally including a coupling connection and a coupling controller, where one coupling communication device 107 is selected, a coupling controller of which is activated, while coupling controllers of other coupling communication devices are deactivated, and a coupling path 20 to which the selected coupling communication device is connected is operated as an inactive reserve coupling path until a fault occurs, while another coupling path 10 are operated as an active main coupling path for transmitting payload data.

The method comprises detecting, by the coupling communication devices 106, 205 connected to the main coupling path, an occurrence of the fault on the main coupling path and transmitting status datagrams 32 to the selected coupling communication device, as indicated in step 210. In accordance with the invention, the status datagrams additionally comprise configuration information regarding whether the respective coupling communication device connected to the main coupling path comprises an activable ring controller.

Next, the selected coupling communication device activates the reserve coupling path for transmitting payload data and transmitting a topology change datagram 33 to each of the first and second subnetworks in the event the fault occurs on the main coupling path, which is signalled by a status datagram, as indicated in step 220. In accordance with the invention, the topology change datagram prompts the communication devices to erase their respective local source address tables 111, 121, . . . , 171, 211, 221, . . . , 271 after a predefined period of time has elapsed.

Next, the predefined period of time compared to a reference value is shortened if no coupling communication device connected to the main coupling path comprises an activable ring controller, as indicated in step 230.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data transmission in a redundantly operable communication network, in which the communication network comprises at least a first and a second subnetwork, said first and second subnetworks each comprising communication devices interconnected within a ring topology and each having at least one coupling element and a first and a second ring connection, which are switchably interconnectable by the at least one coupling element, the first and second subnetworks each comprising a communication device including an activated ring controller which detects an interruption within a respective ring topology and controls forwarding of payload data between ring connections of a respective communication device based on a detected interruption, the first and second subnetworks being interconnected via two coupling paths and each comprising two coupling communication devices, connected to the coupling paths, which each additionally including a coupling connection and a coupling controller, one coupling communication device being selected, a coupling controller of which being activated, while coupling controllers of other coupling communication devices being deactivated, and a coupling path to which the selected coupling communication device is connected being operated as an inactive reserve coupling path until a fault occurs, while another coupling path being operated as an active main coupling path for transmitting payload data, the method comprising:

detecting, by the coupling communication devices connected to the main coupling path, an occurrence of the fault on the main coupling path and transmitting status datagrams to the selected coupling communication device, the status datagrams additionally comprising configuration information regarding whether the respective coupling communication device connected to the main coupling path comprises an activable ring controller;

activating, by the selected coupling communication device, the reserve coupling path for transmitting payload data and transmitting a topology change datagram to each of the first and second subnetworks in the event the fault occurring on the main coupling path, which is signaled by a status datagram, said topology change datagram prompting the communication devices to erase respective local source address tables after a predefined period of time has elapsed; and shortening the predefined period of time if no coupling communication device connected to the main coupling path comprises an activable ring controller.

2. The method as claimed in claim 1, wherein the activated coupling controller controls forwarding of payload data from and/or to the coupling connection of the selected coupling communication device based on a detected fault occurrence on the main coupling path.

3. The method as claimed in claim 1, wherein a status datagram displays a link which has been set up or cleared at the respective coupling connection.

4. The method as claimed in claim 2, wherein a status datagram displays a link which has been set up or cleared at the respective coupling connection.

5. The method as claimed in claim 1, wherein the predefined period of time is indicated by the selected coupling communication device in the topology change datagram and shortened based on the configuration information in the respective status datagram.

6. The method as claimed in claim 1, wherein the status datagrams comprise MRP_InLinkChange data frames in accordance with International Electrotechnical Commission (IEC) standard 62439-2, and wherein the topology change datagrams are MRP_InTopologyChange data frames in accordance with the IEC 62439-2 standard.

7. The method as claimed in claim 6, wherein the communication devices having an activated ring controller send an MRP_TopologyChange data frame in accordance with the IEC 62439-2 standard to the communication devices within respective subnetworks upon receiving a MRP_InTopologyChange data frame;

wherein the MRP_TopologyChange data frame comprises an indication of a period of time predefined by the selected coupling communication device; and wherein upon receiving the MRP_TopologyChange data frame the communication devices erase respective local source address tables after the predefined period of time has elapsed from reception of the MRP_TopologyChange data frame.

8. The method as claimed in claim 1, wherein at least one of the first and second subnetworks each comprise multiple communication devices having an activable ring controller; and wherein communication devices having the activable ring controller take a priority characteristic associated with each of said communication devices as a basis for selecting one communication device from among one another for the respective subnetwork, the ring controller of which communication device is activated, while other communication devices within the respective subnetwork deactivate respective ring controllers.

9. The method as claimed in claim 1, wherein an activated ring controller detects an interruption within the respective ring topology based on first test datagrams which are sent and received again by a respective communication device.

10. The method as claimed in claim 9, wherein datagrams within the first and the second subnetwork are transmitted in accordance with the Media Redundancy Protocol.

11. The method as claimed in claim 1, wherein the coupling communication devices connected to the main coupling path interchange second test datagrams among one another to detect the occurrence of the fault on the main coupling path.

12. The method as claimed in claim 1, wherein the selected coupling communication device is operated as a media redundancy interconnection manager in accordance with International Electrotechnical Commission (IEC) 62439-2 standard; and wherein the coupling communication devices connected to the main coupling path are each operated in a link check mode in accordance with IEC 62439-2 standard.

13. The method as claimed in claim 1, wherein the coupling communication devices take a priority characteristic associated with each of the coupling communication devices as a basis for selecting one coupling communication device from among one another, the coupling controller of which is activated, while other coupling communication devices deactivate respective coupling controllers.

14. A coupling communication device comprising:

at least one coupling element; and a first and a second ring connection and a coupling connection which are switchably interconnectable by the coupling element;

an activable coupling controller which is configured to operate a coupling path to which the coupling communication device is connected as an inactive reserve coupling path until a fault occurs and operate another coupling path as the active main coupling path for transmitting payload data, wherein the coupling communication device is configured to, when connected to the main coupling path, detect an occurrence of a fault on the main coupling path and to transmit status datagrams to a selected coupling communication device having an activated coupling control unit, the status datagrams additionally comprising configuration information regarding whether the coupling communication device comprises an activable ring controller;

wherein the coupling communication device is further configured to, when operating as a selected coupling communication device, in the event of the occurrence of the fault on the main coupling path, which is signaled by a status datagram, activate the reserve coupling path to transmit payload data and to transmit a respective topology change datagram which prompts further communication devices to erase respective local source address tables after a predefined period of time has elapsed; and wherein the coupling communication device is configured to, when operating as a selected coupling communication device, shorten the predefined period of time if no coupling communication device connected to the main coupling path comprises an activable ring controller.

15. The coupling communication device as claimed in claim 14, wherein the coupling communication device comprises a switch or a bridge.

* * * * *